United States Patent
Kim

(10) Patent No.: US 8,777,433 B2
(45) Date of Patent: Jul. 15, 2014

(54) KEYPAD LIGHTING DEVICE FOR PORTABLE TERMINAL

(71) Applicant: Samsung Electronics Co., Ltd., Gyeonggi-do (KR)

(72) Inventor: Byung-Sun Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/747,711

(22) Filed: Jan. 23, 2013

(65) Prior Publication Data

US 2013/0208441 A1    Aug. 15, 2013

(30) Foreign Application Priority Data

Feb. 14, 2012  (KR) .................. 10-2012-0014617

(51) Int. Cl.
*G01D 11/28*    (2006.01)
(52) U.S. Cl.
USPC ....................... 362/23.03; 362/621
(58) Field of Classification Search
USPC ............. 362/23.03, 621, 628; 200/314, 317
See application file for complete search history.

(56) References Cited

U.S. PATENT DOCUMENTS

| 2003/0099116 A1 | 5/2003 | Nousiainen | |
|---|---|---|---|
| 2009/0014305 A1* | 1/2009 | Aihara et al. | 200/512 |
| 2011/0211368 A1 | 9/2011 | Mishima | |

FOREIGN PATENT DOCUMENTS

| KR | 10-2012-0133260 A | 12/2012 |
|---|---|---|
| WO | 2009/100610 A1 | 8/2009 |

* cited by examiner

*Primary Examiner* — Anne Hines
(74) *Attorney, Agent, or Firm* — Cha & Reiter, LLC

(57) ABSTRACT

A keypad lighting device includes: a keypad member formed by an arrangement of plural key tops; at least one light emitting device arranged below the key pad member; and a light guide plate member arranged below the keypad member to light the key tops with light projected from the light emitting device. The light guide plate member is formed with at least one light-incident surface, to which the light projected from the light emitting device is incident. The light-incident surface is formed by a curved surface or plural inclined surfaces, and at least one of the normal lines of the light-incident surface is arranged to pass through the light emitting surface of the light emitting device.

20 Claims, 8 Drawing Sheets

KEYPAD LIGHTING DEVICE FOR PORTABLE TERMINAL

CLAIM OF PRIORITY

This application claims the priority under 35 U.S.C. §119(a) of an application entitled "Keypad Lighting Device For Portable Terminal" filed in the Korean Intellectual Property Office on Feb. 14, 2012 and assigned Ser. No. 10-2012-0014617, the contents of which are hereby incorporated in its entirety by reference.

BACKGROUND OF THE INVENTION

1. Field of the Invention

The present invention relates to a portable terminal, and more particularly to a keypad lighting device.

2. Description of the Related Art

In general, portable terminals, such as portable computers and mobile communication terminals, include a physical keypad as an input device. Typically such a portable terminal is provided with a lighting device in the keypad to allow a user to easily operate the input device in a using environment, in particular even at night or inside a poorly illuminated room. Terminals that are usually used while being carried by a user, for example, mobile communication terminals, have already been equipped with a keypad lighting device, and also terminals that are typically not carried by a user, for example, portable computers, have begun to be provided with a keypad lighting device, recently. Such a keypad lighting device is also supplied in a wired telephone, a digital door lock, a remote controller for a home appliance or the like.

A common mobile communication terminal is equipped with a physical keypad including key tops in a 3×4 arrangement. Such a physical keypad generally adopts a direct type lighting method. That is, light emitting devices are generally arranged in such a manner that each of the light emitting devices corresponds to one key top, or one light emitting device corresponds to every two or four key tops. As the performances of light emitting devices, such as light emitting diodes, are improved and lighting technologies are developed, edge type lighting devices have become commercially available, in which the edge type lighting devices employ a waveguide film as a light guide plate member. An edge type lighting device includes a waveguide film arranged over the entire area of a keypad, and plural light emitting devices arranged along the edges of the waveguide film, so that the light projected from the light emitting devices can be diffused over the entire area of the keypad through the waveguide film.

As the edge type lighting devices become commercially available, it becomes possible to reduce the space required for installing a keypad and a keypad lighting device. As a result, it is easier to miniaturize a portable terminal by applying such an edge type key pad lighting device. Consequently, such a lighting device is also provided in a keyboard of a portable computer or the like. This is because a lighting device employing a light guide plate allows a wider area to be uniformly lighted with a smaller number of light emitting devices.

Light emitting diodes are typically employed as the light emitting devices for such a keypad lighting device. Although a light emitting diode is suitable as a light emitting device for a keypad lighting device, the intensity of the light is gradually diminished as distance from a light emitting surface thereof increases. That is, there is a limit in angular extent and distance that can be directly lighted by a single light emitting diode.

FIG. 1 illustrates a graph 10 showing a distribution of luminous intensities of a light emitting diode measured while changing an angle in relation to the central axis of a light source, i.e. an optical axis O. FIG. 2 illustrates a graph 20 showing a distribution of luminous intensities of a light emitting diode measured while changing a distance from the light source. FIG. 1 shows ratios of luminous intensities depending on the angle in relation to the optical axis O assuming that the luminous intensity measured on the optical axis O of the light emitting diode is "1," and FIG. 2 shows ratios of luminous intensities depending on the distance from the light source, i.e., a light emitting surface of the light emitting diode assuming that the luminous intensity measured on the light emitting surface of the light emitting diode is "1." From FIGS. 1 and 2, it can be appreciated that no illumination is provided in a range deviated by about 60 degrees from the optical axis O, and luminous intensities are gradually lowered as distance from the light emitting surface increases.

FIG. 3 illustrates a keypad 100 of a portable terminal that includes a conventional edge type lighting device. As shown, the keypad 100 includes a keypad member 101 provided with plural key tops 111, and a dome sheet 102 arranged below the keypad member 101.

The dome sheet 102 may be configured by a flexible printed circuit board 121, which is provided with plural dome switches 123 arranged on one side thereof to correspond to the key tops 111, respectively. A waveguide film 103 as a light guide plate member, and light emitting devices 131 are interposed between the dome sheet 102 and the keypad member 101. The light emitting devices 131 are arranged adjacent to an outermost edge of the waveguide film 103, and the light projected from the light emitting devices 131 are adapted to be capable of lighting the entirety of the keypad member 101 through the waveguide film 103.

The keypad lighting device employing the light emitting devices 131 and the waveguide film 103 as described above may be configured using a substantially reduced number of light emitting devices as compared to the number of the key tops 111.

FIG. 4 exemplifies a configuration of a conventional edge type keypad lighting device, in which a light emitting surface of the light emitting device 131 and a light-incident surface 133 of the waveguide film 103 are arranged parallel to each other. The light projected from the light emitting device 131 is incident to the waveguide film 103 through the light-incident surface 133 after passing through an air layer. The light suffers from refraction while passing through the light-incident surface 133 due to the difference of density between the air layer and the waveguide film 103. Due to the refraction caused by the difference of light propagation media, the angular range to be capable of being lighted by the light incident to the waveguide film will be reduced as compared to the angular lighting range of the light emitting device 131. As a result, the conventional edge type keypad lighting device has a limit in uniformly lighting the entire area of a keypad while reducing the number of light emitting devices.

FIG. 5 illustrates a dome sheet 223 of a keypad that is provided with a conventional direct type keypad lighting device. As shown, it can be seen that the dome sheet 223 is attached on the top of a rigid printed circuit board 221, and plural dome switches 225 are arranged on a surface thereof. It can also be seen that each of the light emitting devices 231 of the keypad lighting device is arranged between the dome switches 225 on the printed circuit board 221.

A keypad, to which a direct type keypad lighting device is applied, employs a silicon pad as a light guide plate member, and key tops are provided on the top surface of the silicon pad, in which the key tops are arranged at the positions corresponding to the dome switches 225, respectively.

FIG. 6 illustrates a light guide plate member 204 employed in a conventional direct type keypad lighting device. As shown, the light guide plate member 204 is formed with plural protrusions 241 on the bottom side thereof, and the protrusions 241 are formed with actuation bumps 243, respectively, in which the actuation bumps 243 correspond to the dome switches 225, respectively. When the light guide plate member 204 is arranged on the dome sheet 223, each of the actuation bumps 243 is arranged to be in alignment with one of the dome switches 225, and in accordance with a user's operation, the actuation bumps 243 directly actuate the dome switches 225, respectively. On the top of the light guide plate member 204, key tops are attached, which are arranged to the positions corresponding to the protrusions 241, respectively. When the light guide plate member 204 is arranged on the printed circuit board 221, each of the light emitting devices 231 is arranged between the protrusions 241 to light one protrusion or two or more protrusions adjacent thereto, and consequently to light the corresponding key top(s).

In the conventional direct type keypad lighting device as described above, the light of the light emitting devices is incident to the protrusions through the light guide plate member. However, since the positions of the protrusions in relation to the light emitting devices are different from each other, the light-incident angles and distances are different from protrusion to protrusion. In addition, some protrusions may be lighted by one light emitting device, and some protrusions may be lighted by two or more light emitting devices. As a result, the conventional direct type keypad lighting device suffers from substantial difficulty in uniformly lighting all the key tops. Furthermore, since the surfaces of a single protrusion, to which the light of one or more lighting or light emitting devices is incident, are various, locally bright and dark areas are produced even in one key top.

SUMMARY OF THE INVENTION

Accordingly, an aspect of the present invention is to solve the above-mentioned problems occurring in the prior art and provides additional advantages, by providing a keypad lighting device capable of improving lighting efficiency and lighting uniformity over the entire area of a keypad.

Another aspect of the present invention is to provide a keypad lighting device capable of contributing to the improvement in designing an appearance of a portable terminal or the like by improving the lighting uniformity of the entire area of the keypad.

In accordance with an aspect of the present invention, there is provided a keypad lighting device including: a keypad member formed by an arrangement of plural key tops; at least one light emitting device arranged below the key pad member; and a light guide plate member arranged below the keypad member to light the key tops with light projected from the light emitting device, wherein the light guide plate member is formed with at least one light-incident surface, to which the light projected from the light emitting device is incident, the light-incident surface being formed by a curved surface or plural inclined surfaces, and at least one of the normal lines of the light-incident surface is arranged to pass through the light emitting surface of the light emitting device. Further, the light guide plate member may be arranged between the keypad member and the light emitting device to light the key tops with light projected from the light emitting device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Further, for the purposes of clarity and simplicity, a detailed description of known functions and configurations incorporated herein will be omitted as it may make the subject matter of the present invention unclear.

FIGS. 7A to 9B illustrates a main part of an edge type keypad lighting device in accordance with an exemplary embodiment in an enlarged scale, in which the distances between a light emitting surface of a light emitting device 331 and light-incident surfaces 333a, 333b, and 333c of the light guide plate member 303 is varied. Each of the light-incident surfaces 333a, 333b, and 333c of the inventive light guide plate member 303 is formed in an inclined arrangement, preferably in a curved surface. More preferably, in the inventive keypad lighting device, each of the light-incident surfaces 333a, 333b, and 333c of the light guide member 303 is a part of a circle (I) centered to the light emitting surface of the light emitting device 331, and has a circular arc shape with a predetermined curvature radius.

Figure 1:
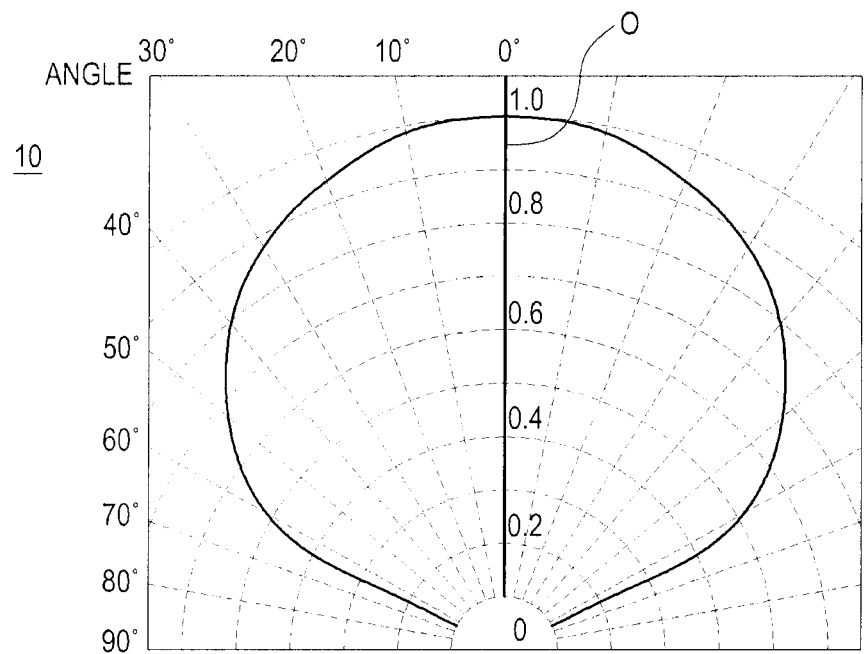
FIG. 1 is a graph illustrating a distribution of luminous intensities of a light emitting diode measured with respect to varying angles in relation to an optical axis.
Figure 2:
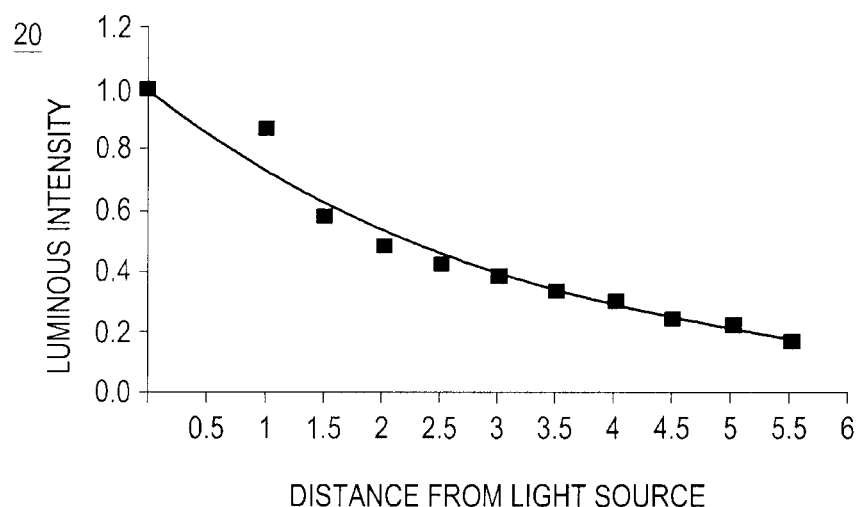
FIG. 2 is a graph illustrating a distribution of luminous intensities of a light emitting diode measured with respect to varying distances from a light source.
Figure 3:
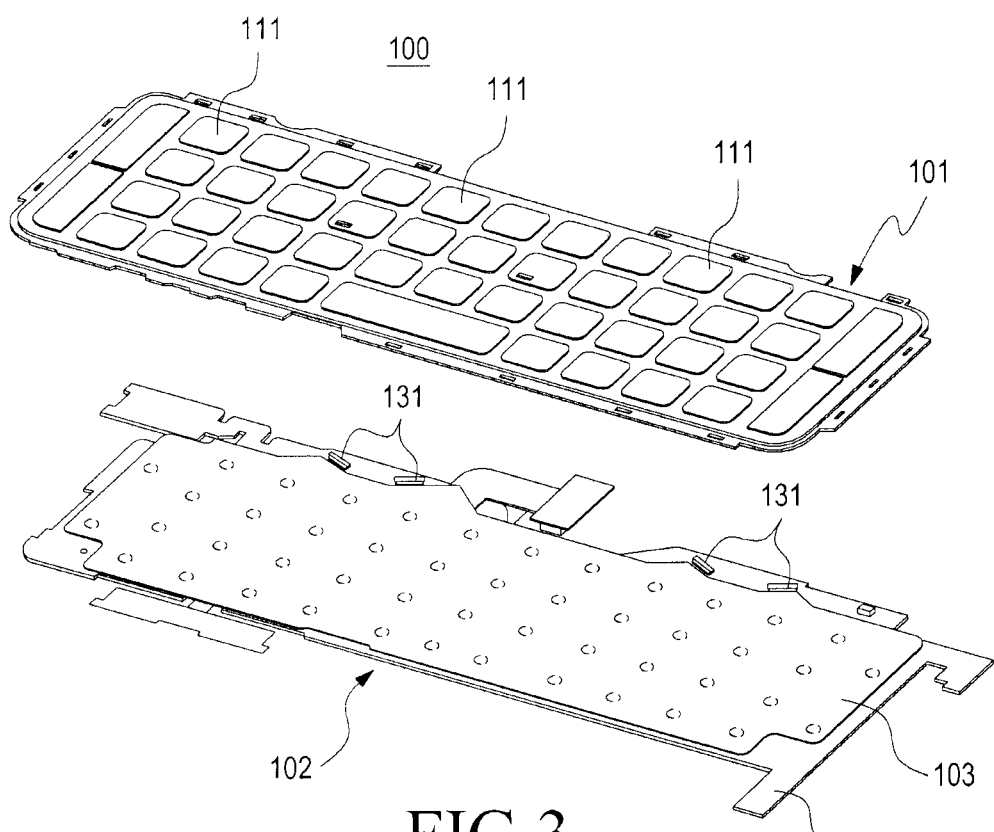
FIG. 3 is an exploded perspective view illustrating a keypad which is provided with a conventional edge type lighting device.
Figure 4:
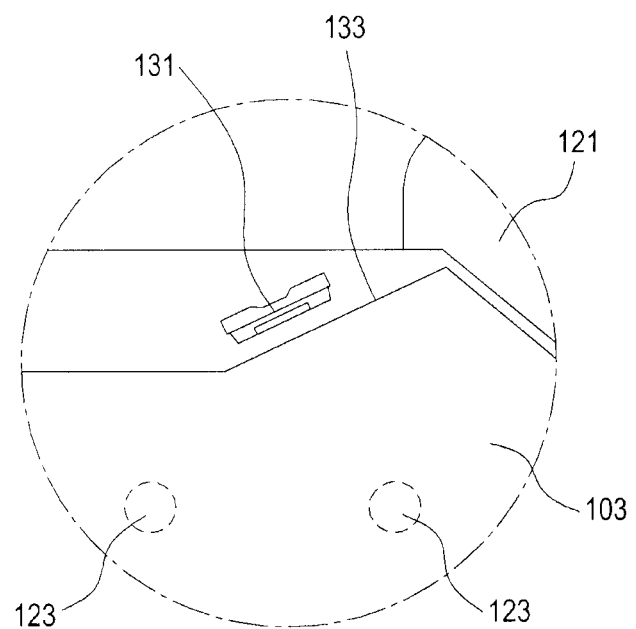
FIG. 4 illustrates a main part of the conventional edge type key pad lighting device in an enlarged scale.

It should be noted that when the keypad lighting device in accordance with the exemplary embodiment of the present invention is described below, the description will be made further with reference to FIG. 3 to appreciate the understanding of the present invention.

At least one light emitting device 331 and a light guide plate member 303 are arranged below a keypad member 101, in which the light guide plate member 303 diffuses light projected from the light emitting device 331 over the entire area of the keypad member 101. Each of light-incident surface 333a, 333b or 333c of the light guide plate member 303 is formed by a curved surface or plural inclined surfaces, and the light-incident surfaces 333a, 333b, and 333c are arranged in such a manner that at least one of the normal lines of each of the light-incident surfaces 333a, 333b, and 333c passes through the light emitting surface of the light emitting device 331. The light emitting device 331 and the light guide plate member 303 may be provided on a dome sheet or a flexible printed circuit board 321 which forms the dome sheet.

The keypad member 101 is provided with plural key tops 111 on the top thereof, and each of the key tops 111 is printed with an assigned character or the like. The light projected from the light emitting device 331 is provided to the characters printed on the key tops 111 to allow a user to visually recognize and operate the characters assigned to the key tops 111 even in a dark room or at night.

The light emitting device 331 is adapted to provide light for lighting the keypad member 101, and a light emitting diode may be preferably used as the light emitting device 331. The light emitting diode is a substantially semi-permanent and low power consuming light source, and is suitable for use as a lighting device of a keypad or a display device. The light emitting device 331 is arranged below the keypad member 111, and projects light laterally, i.e. toward a direction in which the key tops 111 of the keypad member 110 are arranged.

The light guide member 303 may be configured by using a waveguide film, and is arranged below the keypad member 101 to be in alignment to the keypad member 101. The light guide member 303 will diffuse the light projected from the light emitting device 331 over the entire area of the keypad member 111. At least one side of the light guide plate member 303 is provided with at least one, but preferably a plurality of light emitting devices 331. It should apparent to those skilled in the art that the number and positions of the light emitting devices 331 may be adjusted depending on an area and distance to be lighted.

As described above, it is preferred that each of the light-incident surfaces 333a, 333b, and 333c of the light guide plate member 303 is formed by a curved surface or an arrangement of plural inclined surfaces. In such a case, each of the light-incident surfaces 333a, 333b, and 333c is arranged in such a manner that at least one of the normal lines thereof passes through the light emitting surface of the light emitting device 331. Since the angular range to be capable of being lighted by the light projected from the light emitting device is limited, the extent for forming the light-incident surfaces 333a, 333b, and 333c or the distances from the light-incident surfaces 333a, 333b, and 333c to the light emitting surface of the light emitting device 331 may be limited within a predetermined extent. If each of the light-incident surfaces 333a, 333b, and 333c is formed by an arrangement of plural inclined surfaces while being formed in this limited extent, the entire shape of each of the light-incident surfaces 333a, 333b, and 333c will approach that of a curved surface as the number of the inclined surfaces increases. Therefore, it is noted that a curved light-incident surface is exemplified and described in a specific exemplary embodiment of the present invention.

Figure 7A:
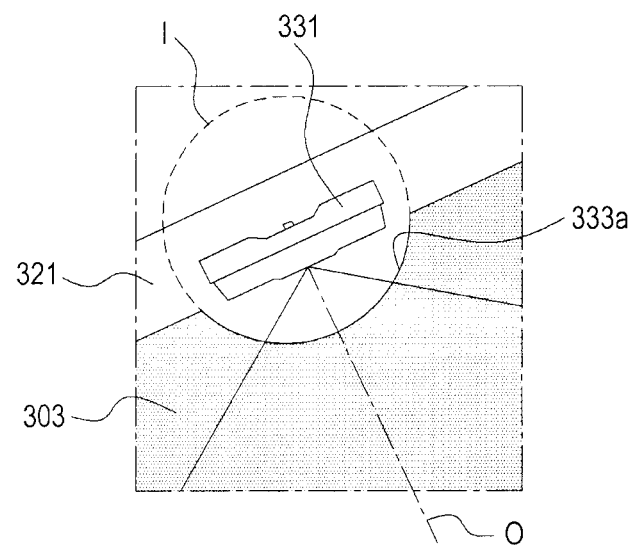
FIGS. 7A to 9B illustrate a main part of an edge type keypad lighting device in accordance with an exemplary embodiment of the present invention.
Figure 7B:
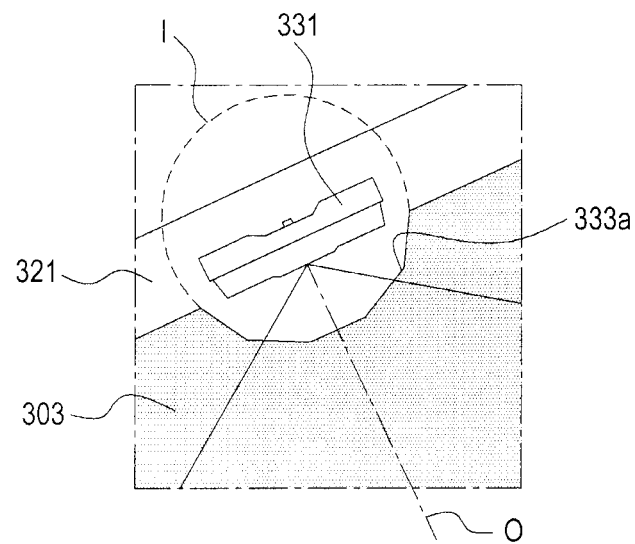
Figure 8A:
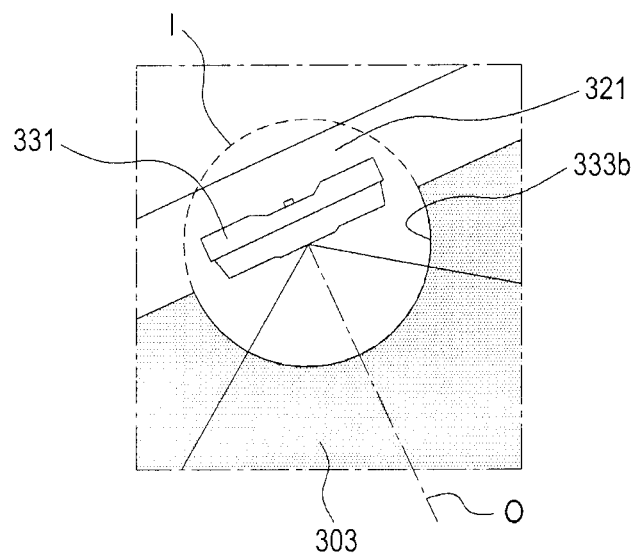
Figure 8B:
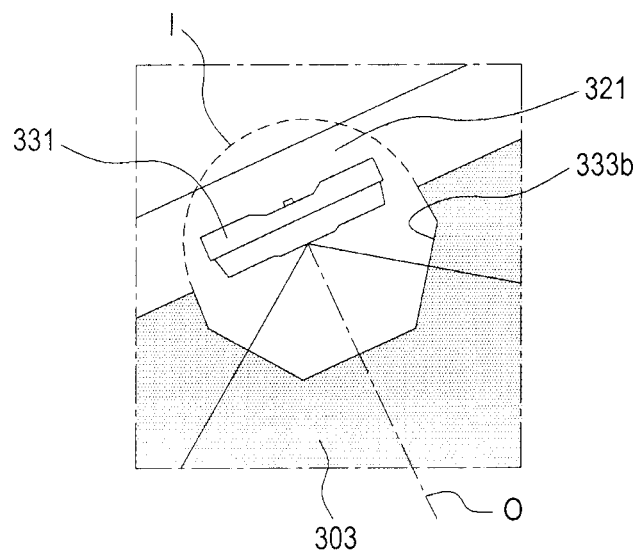
Figure 9A:
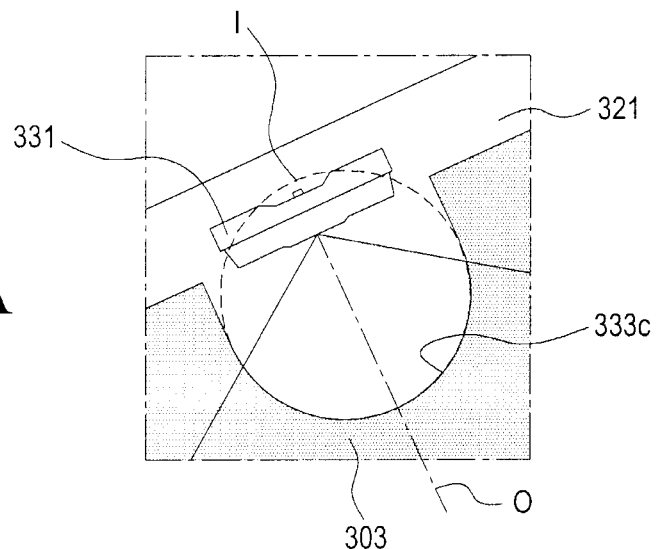
Figure 9B:
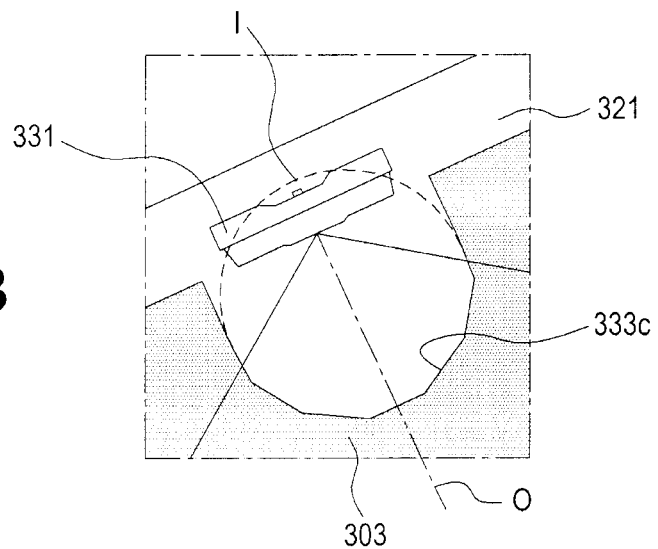

Each of the light-incident surfaces 333a, 333b, and 333c of the light guide plate member 303 takes a shape of substantially a part of a circle, i.e. a circular arc, and thus has a predetermined curvature radius. In such a case, as illustrated in FIGS. 7A and 7B, the light emitting surface of the light emitting device 331 may be arranged at a distance, which is shorter than the curvature radius from the light-incident surface 333a (the distance will be referred to as a "first standard"), as illustrated in FIGS. 8A and 8B, at a distance, which is equal to the curvature radius from the light-incident surface 333b (the distance will be referred to as a "second standard"), or as illustrated in FIGS. 9A and 9B, at a distance, which is longer than the curvature radius, from the light-incident surface 333c (the distance will be referred to as a "third standard").

In arranging the light emitting device 331 adapted to project light to a light-incident surface 333a, 333b or 333c, the optical axis O of the light emitting device 331 is preferably arranged to be in conformity with one of the normal lines of the light-incident surface 333a, 333b or 333c. In addition, the light emitting device 331 is preferably arranged in such a manner that the light-incident surface 333a, 333b or 333c is symmetrically arranged with reference to the optical axis O of the light emitting device 331. More preferably, the light emitting device 331 is arranged in such a manner that its light emitting surface is positioned at the center of the curvature radius of the light-incident surface 333a, 333b or 333c as shown in FIGS. 8A and 8B. In a configuration with the second standard illustrated in FIGS. 8A and 8B, light-incident angles at all the positions on the light-incident surface 333b are equally set to 90 degrees. As a result, it is possible to reduce the lighting concentration in the direction of the optical axis O caused due to the refraction the light suffers in the process of being incident to the light guide plate member 303.

Now, a lighting performance depending on a configuration of a light-incident surface of the light guide plate member 303 will be discussed with reference to FIG. 10.

Figure 10:
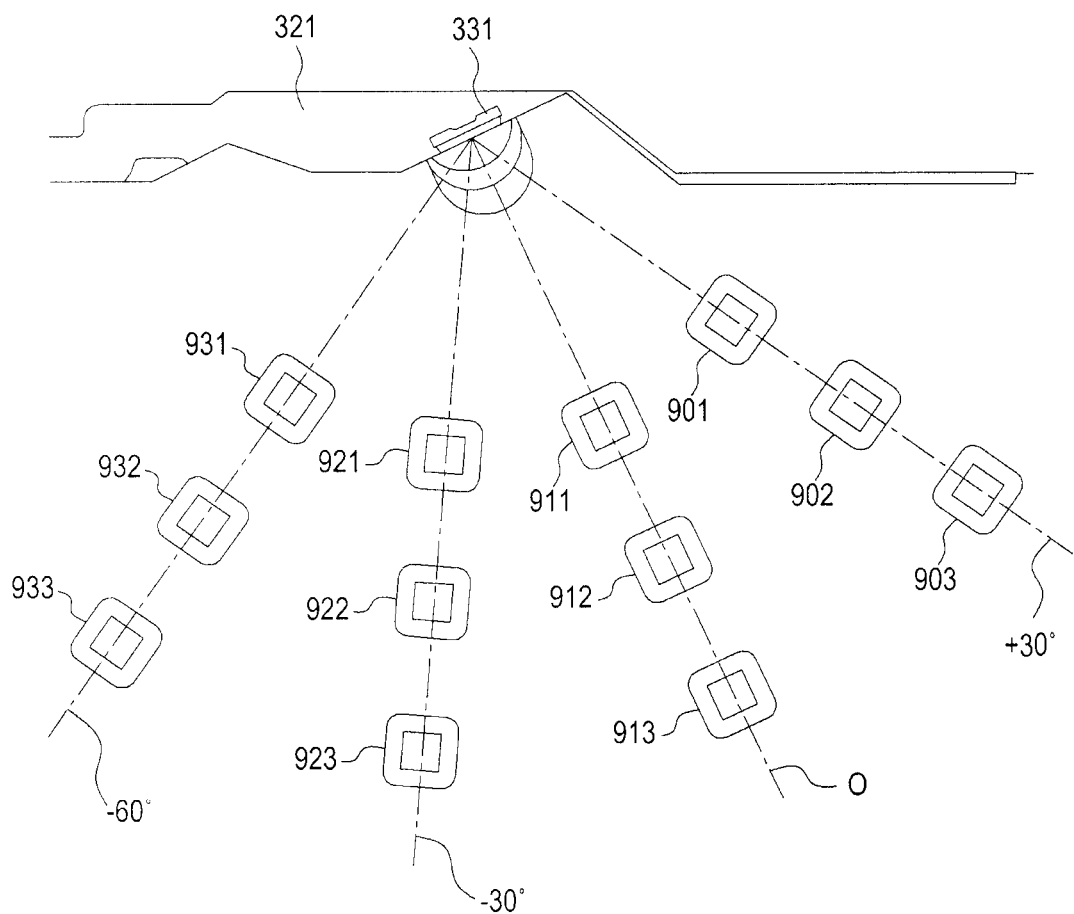
FIG. 10 is a view illustrating a comparison between a prior art and an exemplary version of the present invention edge type keypad lighting device.

FIG. 10 illustrates various three-actinometer arrangements 901, 902 and 903; 911, 912 and 913; 921, 922 and 923; and 931, 932 and 933 in the directions of ±30 degrees and −60 degrees with reference to the direction of the optical axis O as well as in the direction of the optical axis O, while varying the distance from the light emitting device 331. The light emitting device 331, the light guide plate member 303 and the actinometers of the above-mentioned arrangements as well as those of the conventional configuration have the same specifications, respectively, and the configurations of the light-incident surfaces 133, 333a, 333b, and 333c are set to be different from each other. Table 1 indicates lighting performances in accordance with light-incident surface configurations based on the luminous intensities measured through the arrangements illustrated in FIG. 10.

TABLE 1

| Uniformity comparison items | Conventional | $1^{st}$ standard | $2^{nd}$ standard | $3^{rd}$ standard |
|---|---|---|---|---|
| Brightness ratio at refraction blind spot | 37% | 64% | 89% | 77% |
| Light uniformity | 29.22% | 37.07% | 39.08% | 35.02% |
| Luminous intensity in the direction of the optical axis | 100% | 73% | 47% | 42% |

In Table 1, the "brightness ratio at refraction blind spot" item indicates a ratio of the mean luminous intensity at a refraction blind spot, i.e. in the angular direction of −60 degrees from the optical axis O in relation to the mean luminous intensity in each of the angular directions of the optical axis O and ±30 degrees from the optical axis O. In Table 1, the "light uniformity" item indicates a ratio of the mean luminous intensity measured by actinometers 903, 913 and 923, which are most remotely positioned from the light emitting device 331, in relation to the entire mean luminous intensity in each of the angular directions of the optical axis O and ±30 degrees. In Table 1, the "luminous intensity in the direction of the optical axis" item indicates the mean luminous intensities in the direction of the optical axis O measured at each of the standards as ratios, assuming that the mean luminous intensity of the conventional configuration measured in the direction of the optical axis O is 100%.

As indicated in Table 1, it is found that in the conventional configuration, the brightness ratio at the refraction blind spot is merely 37% but when the inventive light-incident surface configurations are applied, it is possible to provide a light brightness ratio of up to a maximum value of 89%. That is, if the inventive light-incident surface configurations are applied, it is possible to light a wider angular extent as compared to the conventional configuration even if the same number of light emitting devices with the same specification is provided.

In addition, it is found that in terms of the light uniformity, it is possible to obtain an improvement in the range of approximately 6% to approximately 10% as compared to the conventional configuration.

Meanwhile, it is obvious that even if any light emitting device is employed, the luminous intensity in the direction of the optical axis is highest. This means that lighting is concentrated in the direction of the optical axis of the light emitting device. The fact that the "luminous intensity in the direction of the optical axis" in Table 1 is high means that the lighting concentration is high in the direction of the optical axis. In view of the measured luminous intensity values in the direction of the optical axis, it is found that a keypad lighting device, to which the inventive light-incident surface configurations are applied, has a low lighting concentration in the direction of the optical axis. Considering the light uniformity and the luminous intensity in the direction of the optical axis in Table 1 in combination, it is found that as the light uniformity is increased, the luminous intensity is usually reduced. However, as compared to the second standard, it is measured that the light uniformity and the luminous intensity in the light-incident surface configuration of the third standard are both reduced, which is caused by the fact that the distances between the light emitting surface of the light emitting device and the light-incident surfaces of the light guide plate member are increased in the third standard. Therefore, it is found that in order to secure the optimal light uniformity, it is required to adjust the distances between the light-incident surfaces of the light guide plate member and the light emitting surface of the light emitting device while configuring the light-incident surface by a curved surface or an arrangement of inclined surfaces.

Through the above mentioned exemplary embodiments, a person ordinarily skilled in the art will appreciate that when each of the light-incident surface 333a, 333b or 333c is formed by an arrangement of plural inclined surfaces, it is necessary for one of the normal lines of the inclined surface to pass through the light emitting surface of the light emitting device 331. In such a case, it will be desired that the inclined surfaces are arranged symmetrically with reference to the normal line that passes through the light emitting surface of the light emitting device 331. That is, an inclined surface, even if it is deviated from the optical axis O of the light emitting device 331, may be preferably arranged in such a manner that the normal line positioned at the center of the inclined surface is arranged to pass through the light emitting surface of the light emitting device 331.

Figure 11:
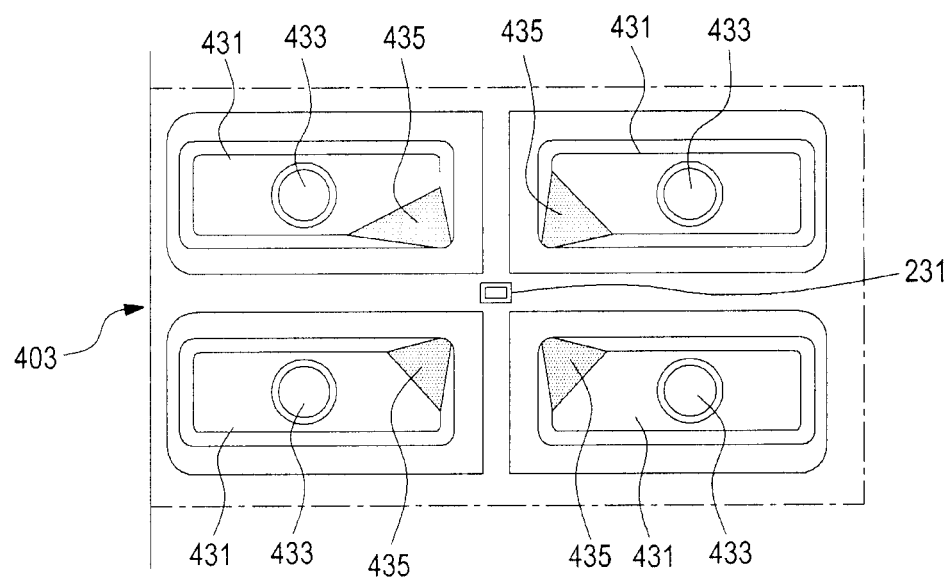
FIG. 11 illustrates a main part of a direct type keypad lighting device in accordance with another exemplary embodiment of the present invention.

FIG. 11 is a view provided to describe a configuration of a keypad lighting device in accordance with another exemplary embodiment of the present invention, in which a configuration applicable to a direct type keypad lighting device is exemplified.

In the direct type keypad lighting device, a silicon pad illustrated in FIG. 11 is arranged below a keypad member (not shown) formed by an arrangement of key tops (not shown), and the silicon pad 403 is substantially used as a light guide plate member. At this time, the key tops are generally attached to the top of the light guide plate member 403. In the configuration of the direct type lighting device, light emitting devices 231 provide light in the direction substantially perpendicular to the surface on which the key tops are arranged.

Figure 5:
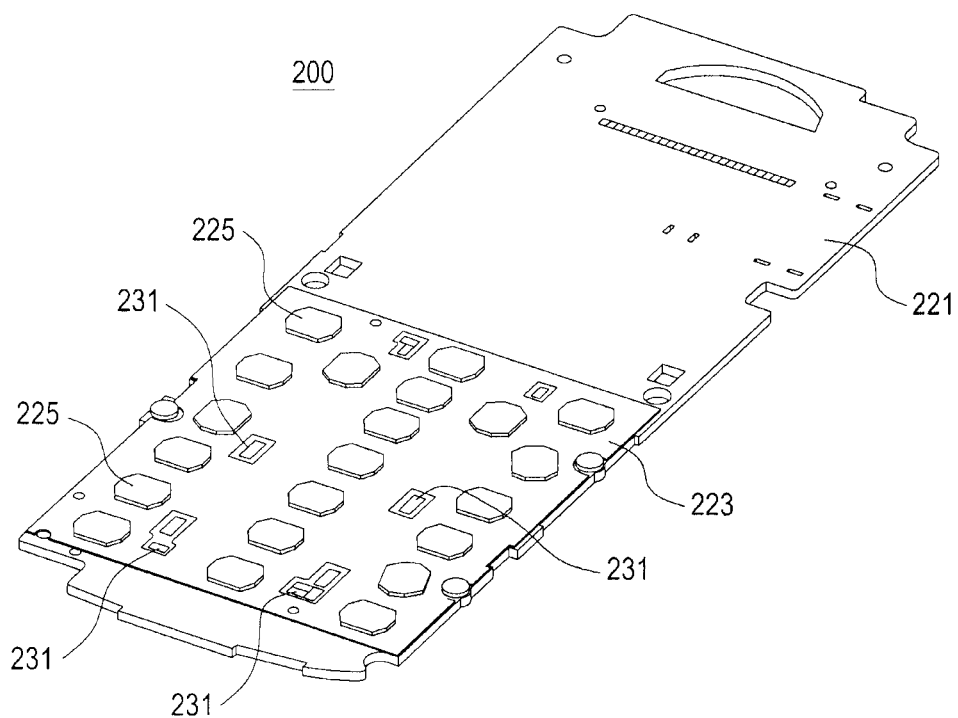
FIG. 5 is a perspective view illustrating a part of a keypad which is provided with a conventional direct type lighting device.
Figure 6:
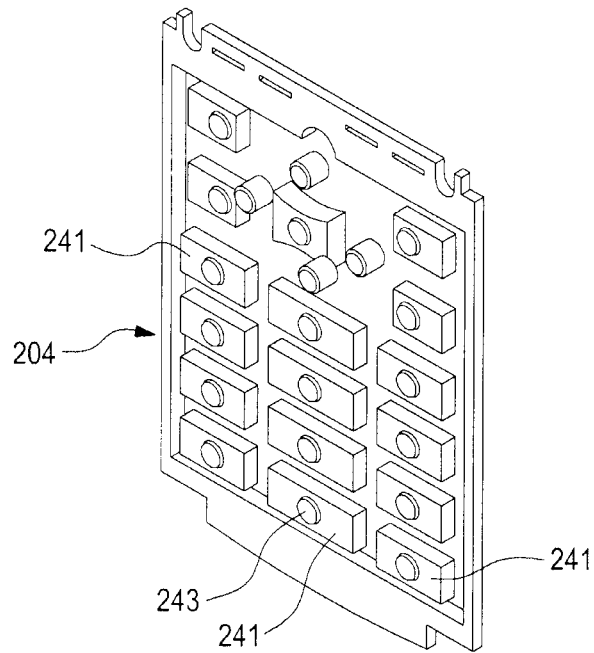
FIG. 6 is a perspective view illustrating a light guide plate member of a conventional direct type key pad lighting device.

Referring to FIGS. 5 and 11, a plurality of light emitting devices 231 are arranged on the printed circuit board 221, and plural dome switches 225 are arranged around each of the light emitting devices 231. On the bottom of the light guide plate 403, there are provided protrusions 431, which correspond to the dome switches 225, respectively, and actuation bumps 433, each of which is formed on one of the protrusions 431. When the user operates the key tops on the top of the light guide plate member 403, the actuation bumps 433 directly actuate the dome switches 225, respectively.

The light guide plate member 403 includes light-incident surfaces 435, each of which is formed on one of the protrusions 431. Each of the light-incident surfaces 435 is formed by a curved surface or plural inclined surfaces. As described above, it is obvious that when a light-incident surface is formed utilizing a plurality of inclined surfaces, the shape of the entirety of the light-incident surface approaches that of a curved surface as the number of inclined surfaces increases.

In the exemplary embodiment illustrated in FIG. 11, each of the light-incident surfaces 435 is formed by an inclined surface formed on each of the protrusions 431. FIG. 11 illustrates a structure that is configured in such a manner that two pairs of protrusions 431 are lighted by one light emitting device 231. Referring to FIG. 5, two pairs of protrusions 431 are arranged around one of the light emitting devices 231 to be lighted.

It is noted that the inclined surfaces formed on the protrusions 431 are not equal to each other in shape. This is because in a direct type keypad lighting device, light provided by individual light emitting devices are mainly provided to the key tops arranged around each of the light emitting devices, and the lighting conditions are varied depending on the positions of the protrusions and the light emitting devices. For example, a key top at an outermost area on the keypad is lighted by only one light emitting device whereas a key top arranged between the light emitting devices is lighted by two light emitting devices. Therefore, in order to reduce a difference in lighting between the key tops lighted by one light emitting device and the key tops lighted by plural light emitting devices, an individual light emitting device may be arranged more closely to a specific protrusion, or the light-incident surfaces formed on the individual protrusions may be varied in shape. However, even if the shape of each of the light-incident surfaces may be different from those of others, one of the normal lines of each light-incident surface should be arranged to pass through the light emitting surface of the light emitting device.

If the light-incident surface of each of the protrusions is arranged on a spherical surface of a predetermined curvature radius and a light emitting device is arranged to be biased to a specific protrusion, the light emitting device may be located at a position deviated from the center of the curvature radius to uniformly light all the key tops. That is, for example, when a light emitting device lights first and second protrusions but is arranged more closely to the first protrusion, it is required to secure a wider light-incident surface for the second protrusion as compared to the first protrusion in order to secure light uniformity between the first and second protrusions. In addition, when two light emitting devices light one protrusion, it is necessary to set the shapes of the light-incident surfaces or the positions of the light emitting devices to be different from each other.

Similarly, in order to apply the inventive configurations to a direct type keypad lighting device, the shapes of the light-incident surfaces and/or the positions of the light emitting devices should be properly adjusted. In this regard, it is noted that in forming light-incident surfaces on protrusions of the light guide plate member or in arranging light emitting devices, one of the normal lines of each light-incident surface should be arranged to pass through the light emitting surface of the corresponding light emitting device.

In addition to varying the position of the light emitting devices and the shape of the light incident surfaces to achieve uniform distribution of light, the standard (first standard, second standard or third standard as explained above) of the light incident surface can also be varied to take advantage of the different light distribution capabilities of each standard type.

The keypad lighting device configured as described above can alleviate the reduction of light emitting extent caused by reflection the light suffers in the process of being incident to a light guide plate member, thereby improving the lighting efficiency. In addition, it is also possible to improve light uniformity over the entire area of the keypad by alleviating the reduction of angular extent of lighting, i.e. the lighting concentration to a specific direction. As a result, it is possible to improve the appearance design of a portable terminal equipped with the inventive keypad lighting device.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A keypad lighting device, comprising:
   a keypad member of the type having plural key tops;
   at least one light emitting device arranged below the keypad member; and
   a light guide plate member arranged below the keypad member to light the key tops with light projected from the light emitting device,
   wherein the light guide plate member is formed with at least one light-incident surface, to which the light projected from the light emitting device is incident, the light-incident surface being formed by a curved surface or plural inclined surfaces, each forming an inner concave curved surface, and at least one of the normal lines of the light-incident surface is arranged to pass through the light emitting surface of the light emitting device,
   wherein the light emitting device is arranged facing the inner concave curved surface.

2. The keypad lighting device as claimed in claim 1, wherein the light guide plate member is a waveguide film, and the light emitting device is arranged on at least one side of the waveguide film.

3. The keypad lighting device as claimed in claim 2, wherein the light-incident surface of the light guide plate member is a curved surface of a circular arch shape having a predetermined curvature radius.

4. The keypad lighting device as claimed in claim 3, wherein the light emitting device is positioned at the center of the curvature radius of the light-incident surface.

5. The keypad lighting device as claimed in claim 3, wherein the light-incident surface has a symmetric shape with reference to the optical axis of the light emitting device.

6. The keypad lighting device as claimed in claim 2, wherein the light-incident surface of the light guide plate member is formed by an arrangement of plural inclined surfaces, and one of the normal lines of the inclined surfaces is arranged to pass through the light emitting surface of the light emitting device.

7. The keypad lighting device as claimed in claim 1, wherein the light guide plate member is a silicon pad having a first and second surface, that is provided with plural protrusions, each of which is arranged to correspond to one of the key tops, wherein the first surface of the silicon pad is adjacent to the keypad member, and wherein the protrusions are formed on the second surface of the silicon pad.

8. The keypad lighting device as claimed in claim 7, wherein the light emitting device is arranged below the silicon pad, and the light-incident surface of the light guide plate member is formed by one or more inclined surfaces formed on each of the protrusions, and one of the normal lines of each of the inclined surfaces is arranged to pass through the light emitting surface of the light emitting device.

9. The keypad lighting device as claimed in claim 7, wherein the light emitting device is arranged below the silicon pad, the light-incident surface of the light guide plate member is a curved surface formed on each of the protrusions, and the light-incident surfaces on the protrusions have the same curvature radius.

10. The keypad lighting device as claimed in claim 9, wherein the light emitting surface of the light emitting device is arranged at the center of the radius of the light-incident surface.

11. The keypad lighting device as claimed in claim 7, wherein the light emitting device is arranged below the silicon pad, and at least one pair of the protrusions are arranged around the light emitting device.

12. The keypad lighting device as claimed in claim 7, wherein the light emitting surface of the light emitting device is arranged at a distance, which is shorter than the curvature radius from the light-incident surface.

13. The keypad lighting device as claimed in claim 7, wherein the light emitting surface of the light emitting device is arranged at a distance, which is longer than the curvature radius, from the light-incident surface.

14. The keypad lighting device as claimed in claim 7, wherein a plurality of light emitting devices are arranged below the silicon pad and in a row adjacent to a parallel row of protrusions.

15. The keypad lighting device as claimed in claim 7, wherein at least one light emitting device is arranged below the silicon pad and adjacent to parallel rows of protrusions.

16. The keypad lighting device as claimed in claim 7, wherein at least one light emitting device is arranged below the silicon pad and adjacent to perpendicular rows of protrusions.

17. The keypad lighting device as claimed in claim 7, wherein the at least one light emitting device is arranged at a distance that is equal from each of the parallel row of protrusions.

18. The keypad lighting device as claimed in claim 7, wherein the at least one light emitting device is arranged at a distance that is unequal from each of the parallel row of protrusions.

19. The keypad lighting device as claimed in claim 7, wherein the at least one light emitting device is arranged at a distance that is equal from each of the perpendicular row of protrusions.

20. The keypad lighting device as claimed in claim 1, wherein the light emitting device is a light emitting diode.

\* \* \* \* \*